United States Patent Office 3,506,240
Patented Apr. 14, 1970

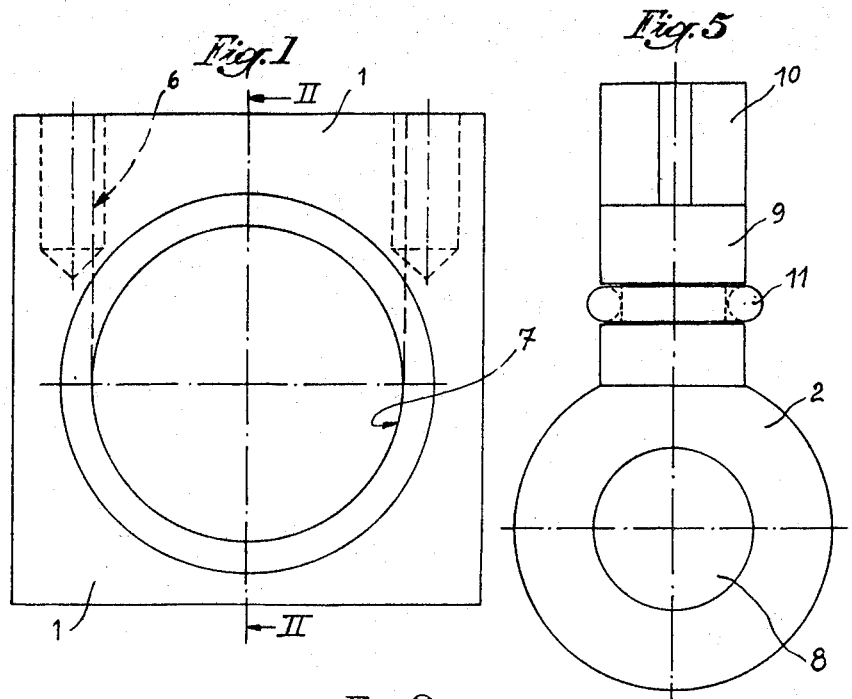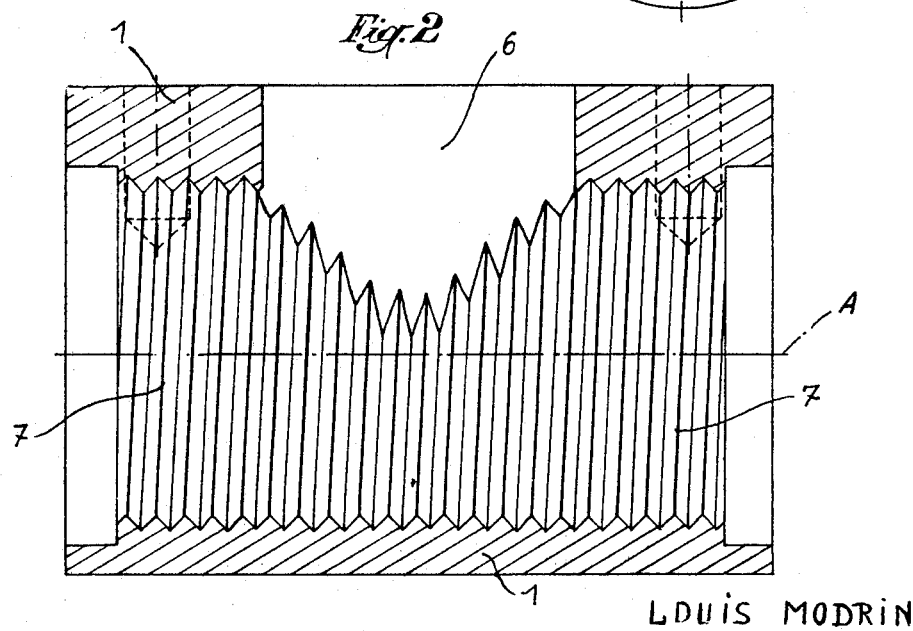

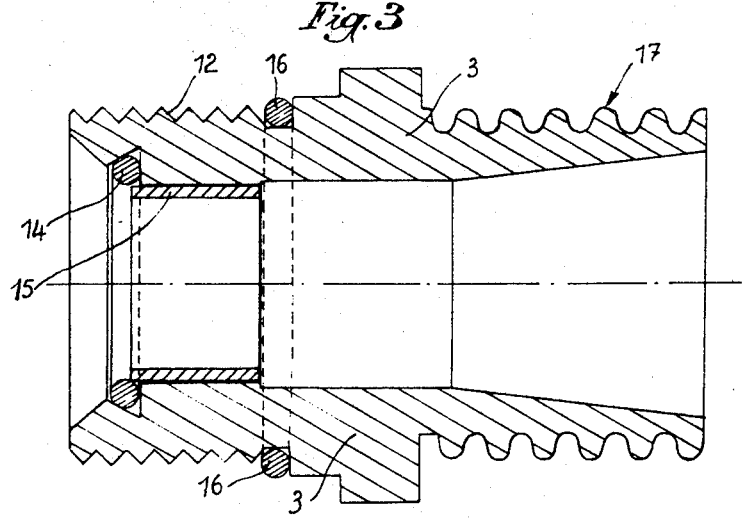
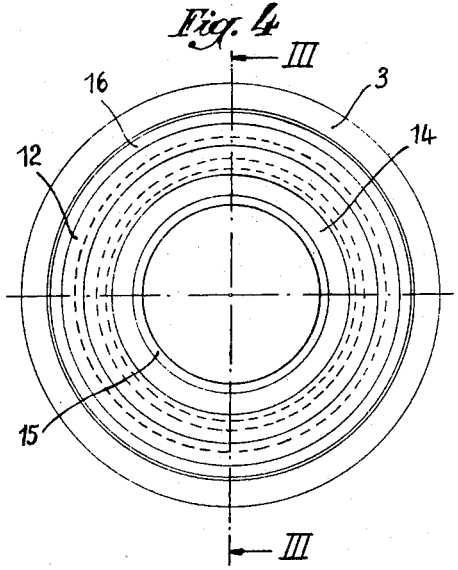
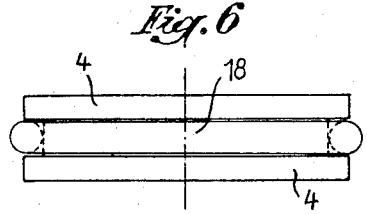
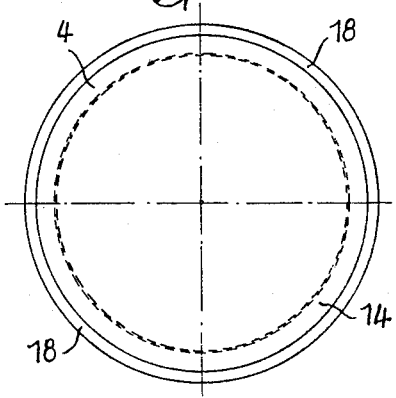

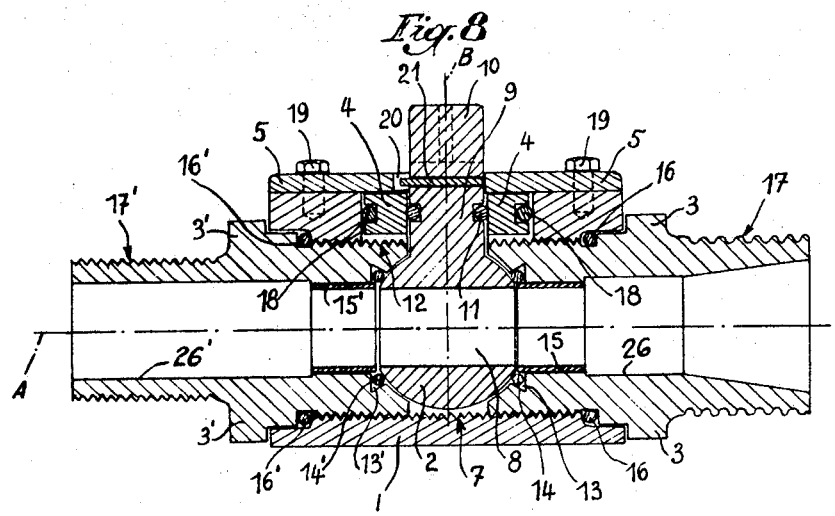
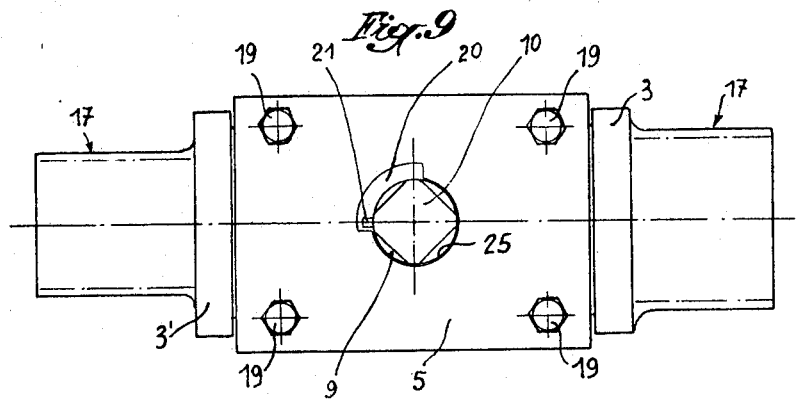
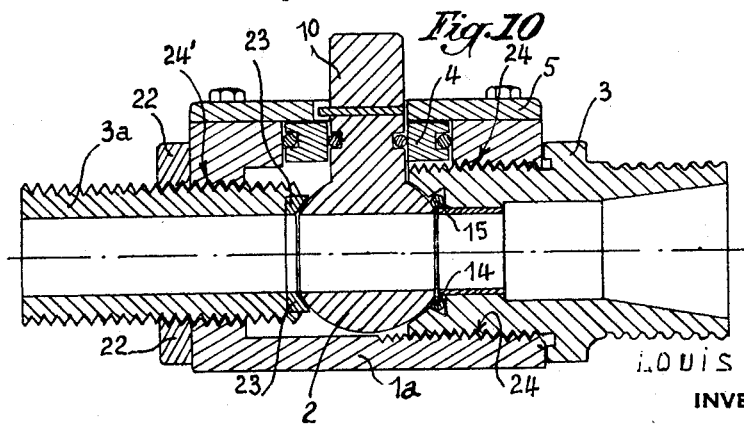

3,506,240
STOPCOCK WITH SPHERICAL VALVE MEMBER
Louis Modrin, St. Etienne, Loire, France
Filed Oct. 22, 1965, Ser. No. 500,557
Claims priority, application France, Nov. 12, 1964,
9,057
Int. Cl. F16k 5/06, 15/04
U.S. Cl. 251—315                6 Claims

ABSTRACT OF THE DISCLOSURE

Stopcock with a prismatic housing having a throughgoing bore into which two coupling sleeves are threaded from opposite ends, the housing also having a side opening which communicates with the bore and is large enough to admit a spherical valve member rotatable about a transverse axis in fluidtight contact with the confronting sleeve ends; a stem rigid with the valve member projects laterally outwardly through a packing disk held in the side opening by a cover plate removably fastened to the housing across that opening.

---

My present invention relates to a stopcock of the type wherein a spherical valve member or plug is disposed in a throughgoing bore of a housing for rotation about a transverse axis, the bore being threaded to receive a pair of coupling sleeves inserted into the housing at opposite ends.

The object of this invention is to provide a simple device of this character which can be easily assembled and disassembled.

In accordance with my invention, the housing of the stopcock has a side opening communicating with the throughgoing bore, the diameter of this side opening being larger than that of the generally spherical valve member whereby the latter can be introduced into the housing or withdrawn therefrom through that opening. A packing disk, surrounding a stem rigid with the valve body, seals the opening against the escape of fluid and is held in position by a cover detachably secured to the housing from the outside.

The invention will be described in greater detail with reference to the accompanying drawing in which:

FIG. 1 is an end view of the stopcock housing;

FIG. 2 is a longitudinal sectional view taken on the line II—II of FIG. 1;

FIG. 3 is a longitudinal sectional view of a coupling sleeve, taken on the line III—III of FIG. 4;

FIG. 4 is an end view of the sleeve of FIG. 3;

FIG. 5 is an elevational view of a valve member fitting into the housing of FIGS. 1 and 2;

FIG. 6 is a side view of a packing disk for the valve member of FIG. 5;

FIG. 7 is a plan view of the disk shown in FIG. 5;

FIG. 8 is an axial sectional view of a stopcock assembled from the elements of the preceding figures;

FIG. 9 is a top plan view of the assembly of FIG. 8; and

FIG. 10 is a view similar to FIG. 8, showing a modification.

The stopcock illustrated in FIGS. 1–9 comprises a four-sided prismatic housing 1 with a threaded throughgoing bore 7 centered on a longitudinal axis A. A side opening 6, centered on a transverse axis B, communicates with bore 7 and with a reduced aperture 25 in a cover plate 5 which is detachably secured to one of the sides of the housing 1 by means of screws 19. A generally spherical valve member 2, integral with a stem 9, is disposed in housing 1 for rotation about axis B, this valve member being bracketed by a pair of coupling sleeves 3, 3' with male threads 12 matingly engaging the threads of bore 7. Sleeves 3, 3' project endwise from housing 1 and also have male threads 17, 17' for connection with external fittings not shown. Sleeves 3, 3' have aligned passages 26, 26' centered on axis A, these passages being interconnected by a channel 8 of valve member 2 in the rotary position thereof illustrated in FIGS. 8 and 9.

Stem 9 of valve member 2 passes outwardly through aperture 25 of cover 5 and terminates in a square head 10. A stud 21 radially projects from the stem 9 into a sectoral cutout 20 of cover 5 which limits the rotation of the stem, and thereby of valve member 2, to an arc of 90° as best seen in FIG. 9. Stem 9 is surrounded by a packing disk 4, see also FIGS. 6 and 7, which is seated in opening 6 with small annular clearances from the rim of this opening and from the stem 9; these clearances are occupied by a pair of toroidal sealing rings 11 and 18 respectively received in an annular groove of stem 9 and in a peripheral groove of disk 4.

Fluidtight contact between sleeves 3, 3' and ball 2 is insured by a pair of further packing rings 14, 14' seated in respective grooves 13, 13' at the end faces of these sleeves proximal to the ball, these grooves having a V-profile and being partly overlain by respective tubes 15, 15' which are received in the passages 26, 26' and terminate short of member 2. The inside diameter of tubes 15, 15' equals that of channel 8 as clearly seen in FIG. 8.

Additional packing rings 16, 16' are inserted between shoulders of sleeves 3, 3' and housing 1.

Since the diameter of ball 2 is less than that of opening 6, the valve member 2 with its stem 9 may be radially extracted from housing 1 and reinserted upon removal of cover plate 5 and separation of sleeves 3, 3'. From FIG. 1 it will be noted that the diameter of opening 6 also equals that of bore 7.

According to the modification of FIG. 10, there is provided a stopcock housing 1a whose bore is stepped so as to form a large-diameter portion 24 on the right and a small-diameter portion 24' on the left, the latter accommodating a modified coupling sleeve 3a held in position by a nut 22. Sleeve 3a bears upon ball member 2 through the intermediary of a packing ring 23 of trapezoidal shape.

What I claim is:

1. A stopcock comprising a housing provided with a threaded throughgoing bore and with a side opening communicating with said bore; a generally spherical valve member in said bore having a diameter smaller than that of said opening and a stem integrally projecting outwardly through said opening; a pair of coupling sleeves threaded from the outside into opposite ends of said bore, said sleeves being formed with longitudinal passages and having end faces making fluidtight contact with said valve member while allowing same to rotate about a transverse axis in line with said stem, said valve member being provided with a channel aligned with said passages in a first rotary position and disaligned therewith in a second rotary position of said valve member; packing means forming a fluidtight seal about said stem within said opening; and a cover detachably secured to the outside of said housing, said cover being traversed by said stem and holding said packing means in position.

2. A stopcock as defined in claim 1 wherein said packing means includes a disk surrounding said stem, a first sealing ring between said disk and said stem, and a second sealing ring between said disk and said housing.

3. A stopcock as defined in claim 1 wherein said cover has an aperture penetrated by said stem and a sectoral cutout adjacent said aperture, said stem being provided with a projection received in said cutout for limiting the rotation of said valve member.

4. A stopcock as defined in claim 1 wherein said housing is generally prismatic, said cover being a plate lying flat against one side of the housing.

5. A stopcock comprising a housing provided with a threaded throughgoing bore and with a side opening communicating with said bore; a generally spherical valve member in said bore having a diameter smaller than that of said opening and a stem integrally projecting outwardly through said opening; a pair of coupling sleeves threadedly received in opposite ends of said bore, said sleeves being formed with longitudinal passages and having end faces making fluidtight contact with said valve member while allowing same to rotate about a transverse axis in line with said stem, said valve member being provided with a channel aligned with said passages in a first rotary position and disaligned therewith in a second rotary position of said valve member, said end faces being formed with annular recesses and being provided with packing rings seated in said recesses and bearing upon said valve member, at least one of said recesses being a V-groove; a tube fitted in the corresponding sleeve adjacent said valve member for holding the respective packing ring in position within said V-groove; packing means forming a fluidtight seal about said stem within said opening; and a cover detachably secured to the outside of said housing, said cover being traversed by said stem and holding said packing means in position.

6. A stopcock as defined in claim 5 wherein said tube has an inner diameter equal to that of said channel.

References Cited

UNITED STATES PATENTS

| | | | |
|---|---|---|---|
| 3,083,945 | 4/1963 | Shafer et al. | 251—315 |
| 3,096,786 | 7/1963 | Rost | 251—315 |
| 3,304,050 | 2/1967 | Fawkes | 251—306 |
| 3,325,142 | 6/1967 | Thompson | 251—306 |
| 343,416 | 6/1886 | Smith et al. | 251—288 X |

FOREIGN PATENTS

| | | |
|---|---|---|
| 967,480 | 8/1964 | Great Britain. |
| 1,064,769 | 9/1959 | Germany. |
| 231,775 | 11/1960 | Austria. |

M. CARY NELSON, Primary Examiner

W. R. CLINE, Assistant Examiner